(12) United States Patent
Li et al.

(10) Patent No.: US 12,293,537 B2
(45) Date of Patent: May 6, 2025

(54) VIRTUAL REALITY EXPERIENCE SAFE AREA UPDATING METHOD AND APPARATUS

(71) Applicants: Beijing BOE Optoelectronics Technology Co., Ltd., Beijing (CN); BOE Technology Group Co., Ltd., Beijing (CN)

(72) Inventors: Zhifu Li, Beijing (CN); Jinghua Miao, Beijing (CN); Wenyu Li, Beijing (CN); Mingyang Yan, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/800,017

(22) PCT Filed: May 28, 2021

(86) PCT No.: PCT/CN2021/096725
§ 371 (c)(1),
(2) Date: Aug. 16, 2022

(87) PCT Pub. No.: WO2022/246795
PCT Pub. Date: Dec. 1, 2022

(65) Prior Publication Data
US 2024/0296580 A1 Sep. 5, 2024

(51) Int. Cl.
*G06T 7/70* (2017.01)
*G01S 17/86* (2020.01)
(Continued)

(52) U.S. Cl.
CPC ............. *G06T 7/70* (2017.01); *G01S 17/86* (2020.01); *G01S 17/89* (2013.01); *G06F 3/011* (2013.01);
(Continued)

(58) Field of Classification Search
CPC ... G06T 7/70; G06T 7/13; G06T 2207/10028; G01S 17/86; G01S 17/89; G06F 3/011; G08B 21/02
See application file for complete search history.

(56) References Cited

U.S. PATENT DOCUMENTS 11,074,463 B2 * 7/2021 Sweet, III ............... G01S 15/93
2011/0128162 A1 * 6/2011 Klepsvik ................. G01S 17/42
348/46

(Continued)

FOREIGN PATENT DOCUMENTS

| CN | 105807920 A | 7/2016 |
| CN | 109813317 A | 5/2019 |

(Continued)

OTHER PUBLICATIONS

International search report and written opinion.

*Primary Examiner* — Sunghyoun Park
(74) *Attorney, Agent, or Firm* — IPro, PLLC (57) ABSTRACT

A virtual reality experience safe area updating method and apparatus are provided. belonging to a Virtual Reality technical field. Virtual reality experience safe area update unit, including: A safe area setting module configured to set an initial safe area; obstacle detecting module, configured to detect obstacle around the user; the safe area update module is configured to update the range of the safe area according to the detected obstacle.

12 Claims, 5 Drawing Sheets

(51) Int. Cl.
  *G01S 17/89* (2020.01)
  *G06F 3/01* (2006.01)
  *G06T 7/13* (2017.01)
  *G08B 21/02* (2006.01)
(52) U.S. Cl.
  CPC ............... *G06T 7/13* (2017.01); *G08B 21/02* (2013.01); *G06T 2207/10028* (2013.01)

(56) References Cited

U.S. PATENT DOCUMENTS

| | | | |
|---|---|---|---|
| 2013/0328928 A1* | 12/2013 | Yamagishi | A63F 13/25 345/633 |
| 2014/0240351 A1* | 8/2014 | Scavezze | G02B 27/017 345/633 |
| 2020/0229669 A1* | 7/2020 | Arnold | A47L 7/0004 |
| 2021/0173471 A1* | 6/2021 | Johnson | G06T 19/20 |
| 2021/0223367 A1* | 7/2021 | Huang | G02B 26/0883 |
| 2022/0171949 A1* | 6/2022 | Xu | G06K 7/10366 |

FOREIGN PATENT DOCUMENTS

| | | |
|---|---|---|
| CN | 110874102 A | 3/2020 |
| CN | 112099638 A | 12/2020 |

\* cited by examiner

Pressure sensor

Shock sensor

VIRTUAL REALITY EXPERIENCE SAFE AREA UPDATING METHOD AND APPARATUS

CROSS-REFERENCE TO RELATED APPLICATION

The present application is the U.S. national phase of PCT Application No. PCT/CN2021/096725 filed on May 28, 2021, which is incorporated herein by reference in its entirety.

TECHNICAL FIELD

The present disclosure relates to Virtual Reality technical fields, and more particularly, to a virtual reality experience safe area updating method and apparatus.

BACKGROUND

VR (Virtual Reality) equipment uses Virtual Reality technology to give immersive experience to a wearer, so that the wearer is in a virtual environment. However, in this process, the wearer cannot see the situation in the real world around, in the process of interaction or movement between wearer and virtual scene, body displacement may occur. If there are other objects in the movement path, there may be potential safety hazards and injury may be caused to the wearer.

SUMMARY

The technical problem to be solved by the present disclosure is to provide a method and apparatus for updating a virtual reality experience safe area, which can ensure the safety of a user.

To address the above technical problem, embodiment of the present disclosure provides technical solution as follows:

In one aspect, there is provided a virtual reality experience safe area updating apparatus applied to VR device, comprising:
- a safe area setting module configured to set an initial safe area;
- an obstacle detecting module, configured to detect obstacle around the user; and
- a safe area updating module, configured to update the range of the safe area according to the detected obstacle.

In some embodiment, the obstacle detecting module comprises:

A laser radar module, which is configured to take a user as a centre, emit a laser signal towards 360° around the user, and receive the reflected laser signal, and determine coordinate and contour of an obstacle around the user according to the received laser signal.

In some embodiment, the obstacle detecting module further comprises:
- a depth camera arranged on the VR headset of the VR device, configured to photograph the environment in the direction faced by the VR headset, and determining coordinate and contour of the obstacle around the user according to the depth image obtained by photographing.

In some embodiment, the laser radar module comprises M laser radar located in the same plane, the centre of the M laser radar constitutes a positive M-sided polygon, the scanning ranges of the M laser radar are all located outside the positive M-sided polygon, the scanning angle of each laser radar is not less than 360/M degrees, and M is an integer greater than or equal to 3.

In some embodiment, the laser radar module comprises four laser radars located in the same plane, the centres of the four laser radars constitute a square, the scanning ranges of the four laser radars are all located outside the square, the scanning angle of each of the laser radars is 90 degrees, and the scanning ranges of different laser radars are different.

In some embodiments, the safe area updating module is configured to convert a first coordinate of the obstacle detected by the obstacle detecting module into a second coordinate under a second coordinate system, if it is judged that the detected obstacle is located in the safe area according to the coordinate range of the safe area under the second coordinate system and the second coordinate, calculating the space occupied by the obstacle according to the second coordinate and the contour of the obstacle, obtaining an updated safe area, wherein the second coordinate system is a coordinate system or a world coordinate system of the VR device, the first coordinate is a coordinate under the first coordinate system, and the first coordinate system is a coordinate system of the obstacle detecting module.

In some embodiments, if the obstacle detecting module comprises a laser radar module and a depth camera, the coordinate and contour of a first obstacle detected by the laser radar module are not completely the same as the coordinate and contour of a second obstacle detected by the depth camera,
   the safe area updating module calculates a first space occupied by the first obstacle according to the position and contour of the first obstacle, calculates a second space occupied by the second obstacle according to the coordinate and contour of the second obstacle, takes the union set of the first space and the second space as the space occupied by the obstacle, and removes the space occupied by the obstacle from the initial safe area to obtain the updated safe area.

In some embodiment, the obstacle detecting module comprises:
   a plurality of pressure sensing units located on the ground of the initial safe area and arranged in multiple array arrangement, wherein the region where different pressure sensing units are located do not overlap, and the region where all the pressure sensing units are located constitute the initial safe area, and each the pressure sensing unit is provided with at least one pressure sensor for sensing the pressure received by the pressure sensing unit;
   a processor, configured to receive pressure data of each of the pressure sensing units, detecting that the pressure data is greater than a candidate pressure sensing unit of a preset first threshold value, judging whether the user is located at the region where the candidate pressure sensing unit is located, and if the user is not located at the region where the candidate pressure sensing unit is located, removing the region where the candidate pressure sensing unit is located from the initial safe area to obtain an updated safe area.

Some embodiments also include:
   a first prompting module, configured to alarm if it is detected that a user approaches a boundary of the safe area or enters a region outside the safe area.

Some embodiments also include:
   a second prompting module, configured to prompt a user to clear the obstacle if the ratio of the area of the updated safe area to the area of the initial safe area is less than a preset second threshold.

The embodiment of the present disclosure also provides a virtual reality experience safe area updating method, applied to a VR device, comprising:

setting an initial safe area;

detecting the obstacle around a user; and updating the range of the safe area according to the detected obstacle.

Detecting the obstacle in the safe area comprises:

In some embodiments, detecting the obstacle in the safe area comprises:

using a laser radar module, taking a user as a centre, emitting a laser signal towards 360° around the user, and receiving the reflected laser signal, and determining coordinate and contour of an obstacle around the user according to the received laser signal;

In some embodiment, detecting the obstacle in the safe area further comprises: photographing an environment in a direction faced by the VR headset using a depth camera set on the VR headset of the VR device, and determining coordinate and contour of the obstacle around the user according to a depth image obtained by photographing.

In some embodiment, the updating the range of the safe area according to the detected obstacle comprises:

converting a first coordinate of the obstacle detected by the obstacle detecting module into a second coordinate under a second coordinate system, if it is judged that the detected obstacle is located in the safe area according to the coordinate range of the safe area under the second coordinate system and the second coordinate, calculating the space occupied by the obstacle according to the second coordinate and the contour of the obstacle, and removing the space occupied by the obstacle from the initial safe area to obtain an updated safe area, wherein the second coordinate system is a coordinate system or a world coordinate system of a VR device, the first coordinate is a coordinate under a first coordinate system, and the first coordinate system is a coordinate system of the obstacle detecting module.

In some embodiment, if the coordinate and contour of the first obstacle detected by the laser radar module are not completely the same as the coordinate and contour of the second obstacle detected by the depth camera, updating the range of the safe area according to the detected obstacle comprises:

calculating a first space occupied by the first obstacle according to the coordinate and contour of the first obstacle, calculating a second space occupied by the second obstacle according to the coordinate and contour of the second obstacle, taking the union set of the first space and the second space as the space occupied by the obstacle, and removing the space occupied by the obstacle from the initial safe area to obtain the updated safe area.

Some embodiments also include:

if it is detected that the user approaches the border of the safe area or enters the region outside the safe area, giving an alarm.

Some embodiments also include:

if the area ratio of the updated safe area to the initial safe area is less than the preset second threshold, prompting the user to clear the obstacle.

The embodiments of the present disclosure also provide a virtual reality experience safe area updating apparatus, wherein the virtual reality experience safe area updating apparatus is applied to a VR device, and the virtual reality experience safe area updating apparatus comprises: a memory and an actuator, the actuator being configured to perform the method as described above.

The embodiment of the present disclosure has the following beneficial effects:

In the above-mentioned scheme, after the initial safe area is set, the obstacle in the safe area is detected, and after the obstacle is detected, the range of the safe area is updated according to the detected obstacle, so that the range of the safe area can be updated in real time according to the situation of the obstacle to ensure the safety of the wearer.

DETAILED DESCRIPTION

In order to make the technical problem, the technical solution and the advantages to be solved by the embodiment of the present disclosure clearer, a detailed description will be given below with reference to the drawings and a embodiment.

When using VR device, the user will draw a closed region with a certain range through VR handle as the range that can move when wearing VR device, namely safe area. When a user approaches the boundary of the safe area or is about to leave the safe area, the VR helmet generates a warning to remind the user not to leave the region. However, there are two problems with this approach: the first problem is that if a static or dynamic obstacle appears in the safe area, especially when the obstacle appears behind the user, the obstacle cannot be detected and the user can be reminded, resulting in a blind area; the second is that safe area cannot be updated.

The embodiment of the present disclosure provides a method and apparatus for updating virtual reality experience safe area, which can dynamically update safe area and ensure the safety of wearer.

The embodiment of the present disclosure provides a virtual reality experience safe area updating apparatus, applied to a VR device, comprising:

a safe area setting module configured to set an initial safe area;

an obstacle detecting module, configured to detect obstacle around the user; and a safe area updating module, configured to update the range of the safe area according to the detected obstacle.

In this embodiment, after the initial safe area is set, the obstacle in the safe area is detected, and after the obstacle is detected, the range of the safe area is updated according to the detected obstacle, so that the range of the safe area can be updated in real time according to the situation of the obstacle to ensure the safety of the wearer.

In some embodiment, the safe area setting module comprises:

VR handle is used for drawing a closed region in a space as a safe area according to an operation Instruction of a user after receiving the user indication to initialize the Instruction of the safe area.

The VR device comprises a VR helmet and a VR handle, wherein the VR helmet can contain an IMU (Inertial Measurement Unit, measurement cell) gyroscope, a depth camera, a data calculating processor and a rendering processor; the VR handle may contain an IMU inertial navigation system to acquire the real-time position and attitude of the VR handle.

The setting of safe area needs to be performed through a VR handle. After starting the VR device, the user can click a button of "initializing safe area" through the VR handle; after the VR handle receives the Instruction that the user indicates to initialize safe area, the user takes the VR handle to draw a closed region in the space; VR handle sets this closed region as the initial safe area according to the user's operation Instruction. The initial safe area shall have no obstacle hindering the user's action, but if dynamic or static obstacle occurs in the safe area, it will affect the user's safety. Therefore, the safe area needs to be updated dynamically according to the range of obstacle.

Figure 1:
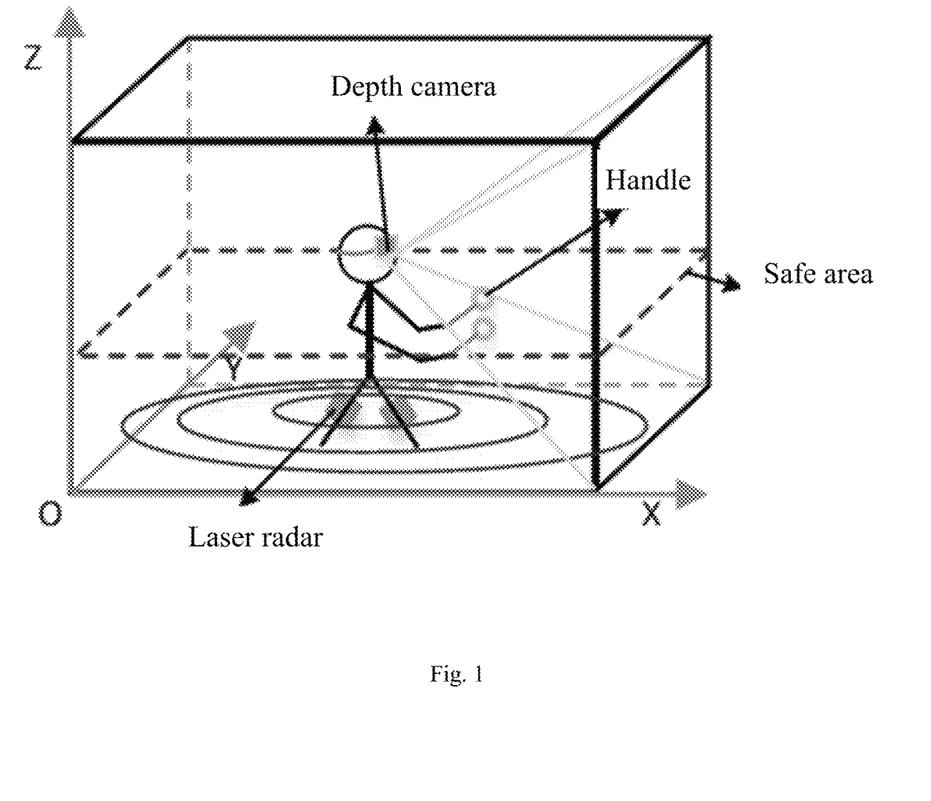
FIG. 1 is a schematic diagram of setting an initial safe area in the embodiment of the present disclosure.

As shown in FIG. 1, the region defined by a dotted line therein is an initial safe area, wherein the initial safe area takes a point where the position where the VR handle starts is perpendicular to the status as an origin O, the direction of starting the movement is an X axis, the opposite direction of ending the movement is a Y axis, and the Z axis is perpendicular to the XY plane; and the representation of the boundary of the safe area under the coordinate system is composed of a stack of discrete points connected to form a line. The safe area is a three-dimensional space, and the coordinate axes of the coordinate system of the safe area are the X-axis, the Y-axis and the Z-axis, and the coordinate system is the coordinate system of the VR device.

Figure 2:
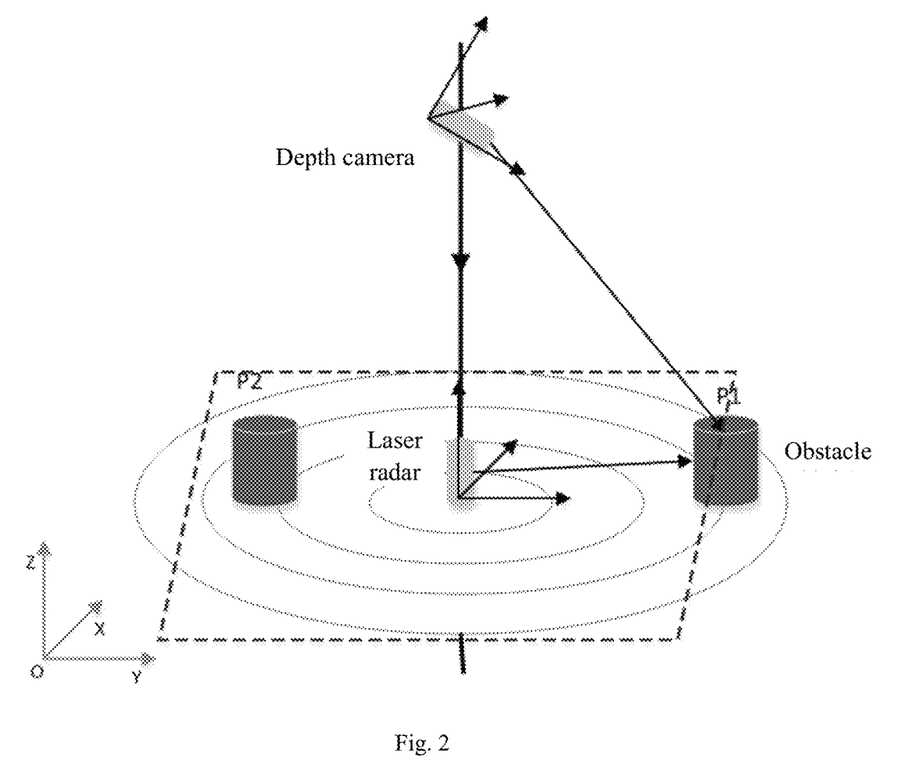
FIG. 2 is a schematic diagram of the embodiment of the present disclosure using laser radar and depth camera to detect obstacle.

In some embodiment, as shown in FIG. 2, the obstacle detecting module comprises at least one of.

A laser radar module, which is configured to take a user as a centre, emit a laser signal towards 360° around the user, and receive the reflected laser signal, and determine coordinate and contour of an obstacle around the user according to the received laser signal.

In some embodiments, the laser radar module may comprise M laser radars located in the same plane, the centres of the M laser radars constitute a positive M-sided polygon, the scanning ranges of the M laser radar are all located outside the positive M-sided polygon, the scanning angle of each laser radar is not less than 360/M °, and M is an integer greater than or equal to 3.

The existing VR headset is provided with a depth camera, and the depth camera can photograph the environment in the direction facing the VR headset, but cannot photograph the depth image in the direction facing away from the VR headset, which would lead to a detection blind zone and cannot detect the obstacle behind the user. Considering the head display structure and user comfort, it is not suitable to install more depth camera in the head display. In this embodiment, laser radar module is configured to detect obstacle, which can detect 360° obstacle around the user, so as to avoid the detection blind zone.

Laser radar module can be worn on the user, such as binding on the lower leg of the user through straps, and transmitting and receiving laser signal in 360° range with the user as the center.

Figure 3:
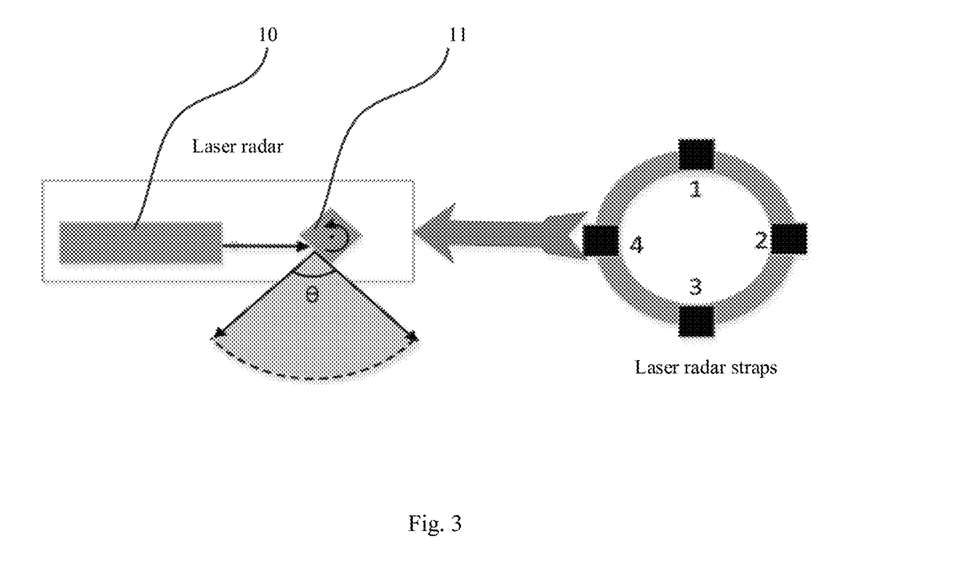
FIG. 3 is a schematic representation of an embodiment laser radar module of the present disclosure.

As shown in FIG. 3, in a specific example, the laser radar module comprises four laser radars (1, 2, 3 and 4) located on the same plane; the four laser radars are fixed on the laser radar straps equidistantly; the centres of the four laser radars form a rectangle; the scanning ranges of the four laser radars are all located outside the rectangle; the scanning angle of each of the laser radars is 90°; and the scanning ranges of different laser radars are different. As shown in the left half of FIG. 3, each laser radar comprises a laser emitting receiver 10 and a mirror structure 11, wherein the mirror of the mirror structure 11 can rotate at a uniform speed, so that the angle between the mirror and the laser emitted by the laser emitting receiver 10 is between 0°-90°; the mirror reflects the laser emitted by the laser emitting receiver 10 and then emits same; the laser encounters the obstacle and is reflected by the obstacle to the mirror; the laser emitting receiver 10 can determine the coordinate and contour of the obstacle through the received laser. Here, each laser radar can detect an obstacle within an angle theta range, and theta is 90° so that an obstacle within a user 360° range can be detected by four laser radars.

Of course, the number of laser radars included in the laser radar module is not limited to four, but can also be more, which can improve the accuracy of obstacle detection; the laser radar module may also comprise fewer laser radars, such as 3 laser radars, as long as the laser radar module is able to detect an obstacle within a 360° range of the user.

When a laser radar receives a returned laser signal at a certain angle, the distance s between the obstacle of the angle and the user is calculated according to the distance formula. Wherein the position of the user in the safe area can be determined by the IMU gyroscope provided on the VR helmet, and whether the obstacle is located in the initial safe area can be judged according to the position of the user in the safe area and the distance between the obstacle and the user in the angle; if the obstacle is located in the initial safe area, the position P of the obstacle will be calculated and transmitted to the safe area update module in the VR helmet so as to remind the user; if the obstacle is outside the original safe area, the obstacle is ignored. Wherein the distance formula is:

$$s = \frac{t_1 - t_0}{2} * v$$

Where t1 is the time when the laser signal is received, t0 is the time when the laser signal is emitted, and v is the propagation speed of the laser.

In this embodiment, the position P of the obstacle is calculated after judging that the obstacle is located within the initial safe area, and if the obstacle is located outside the initial safe area, the position of the obstacle is not calculated, and the calculation amount can be reduced.

In some embodiment, the obstacle detecting module further comprises:

a depth camera arranged on the VR headset of the VR device, configured to photograph the environment in the direction faced by the VR headset, and determining coordinate and contour of the obstacle around the user according to the depth image obtained by photographing. The depth camera can photograph a scene in the travel direction of the user to obtain a depth image; the depth image can capture the obstacle, and can also determine the distance between the obstacle and the user, the size of the obstacle and the contour.

In this embodiment, obstacle detecting module may include laser radar module and depth camera, or only laser radar module.

In some embodiments, the safe area updating module is configured to convert a first coordinate of the obstacle detected by the obstacle detecting module into a second coordinate under a second coordinate system, if it is judged that the detected obstacle is located in the safe area according to the coordinate range of the safe area under the second coordinate system and the second coordinate, calculating the space occupied by the obstacle according to the second coordinate and the contour of the obstacle, obtaining an updated safe area, wherein the second coordinate system is a coordinate system or a world coordinate system of the VR device, the first coordinate is a coordinate under the first coordinate system, and the first coordinate system is a coordinate system of the obstacle detecting module.

Figure 4:
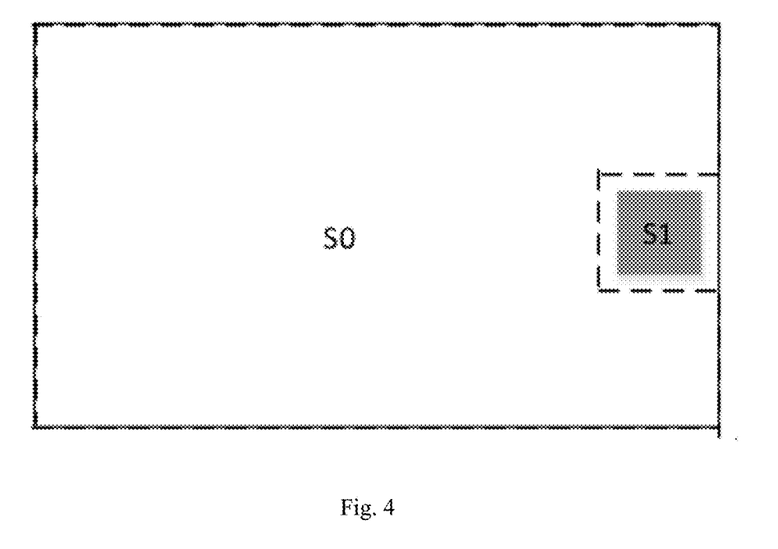
FIG. 4 is a schematic diagram of the embodiment of the present disclosure updating a safe area.

As shown in FIG. 4, assuming that an obstacle is detected and the obstacle is located in an initial safe area S0, calculating a space S1 occupied by the obstacle according to the coordinate and contour of the obstacle, removing the space S1 from the safe area S0, and the updated safe area being S0-S1. When space S1 is removed, the boundary of safe area needs to be redefined, and the boundary of safe area can be redefined according to the boundary of space S1, so that the updated safe area does not include space S1.

In some embodiment, if the obstacle detecting module only comprises laser radar module, the first space occupied by the first obstacle can be calculated according to the coordinate and contour of the first obstacle detected by the laser radar module, and the first space occupied by the obstacle is removed from the initial safe area to obtain an updated safe area.

If the obstacle detecting module comprises both laser radar module and depth camera, the coordinate and contour of the first obstacle detected by the laser radar module and the coordinate and contour of the second obstacle detected by the depth camera may or may not be completely the same. If the coordinate and contour of the first obstacle detected by the laser radar module are not completely the same as the coordinate and contour of the second obstacle detected by the depth camera, the safe area updating module is used for calculating a first space occupied by the first obstacle according to the coordinate and the contour of the first obstacle, and calculating a second space occupied by the second obstacle according to the coordinate and the contour of the second obstacle; taking the union set of the first space and the second space as the space occupied by the obstacle, and removing the space occupied by the obstacle from the initial safe area to obtain an updated safe area.

For example, a laser radar module detects coordinate and contour of a first obstacle, and calculates a first space S2 occupied by the first obstacle according to the coordinate and contour of the first obstacle; the depth camera detects coordinate and contour of a second obstacle, and calculates a second space S3 occupied by the second obstacle according to the coordinate and contour of the second obstacle; take the union of S3 and S2, which includes both S3 and S2, and remove the union from the initial safe area to obtain the updated safe area. In this way, the safe area can be updated by combining the detection results of laser radar module and depth camera, so as to improve the accuracy of detection, ensure the safety of users and provide comfortable experience for users.

If the coordinate and contour of the first obstacle detected by the laser radar module are completely the same as the coordinate and contour of the second obstacle detected by the depth camera, it means that the two detected are the same obstacle, the safe area update module can calculate a first space occupied by the first obstacle according to the coordinate and contour of the first obstacle, and can also calculate a second space occupied by the second obstacle according to the coordinate and contour of the second obstacle; and removing the first space or the second space from the initial safe area to obtain an updated safe area.

In this embodiment, the laser radar module will real-time scan the information within the 360° range of the user, while the depth camera is generally towards the travel direction of the user, only the image in the travel direction will be photographed; therefore, the laser radar module can be configured to scan the obstacle within the 360° range of the user firstly, and if it is found that the obstacle appears behind the user, the user can be prompted to turn the head towards the obstacle, and information about the obstacle is further collected through the depth camera, so that the depth camera is enabled only when the obstacle behind the user is detected, and the power consumption of the depth camera can be reduced. Among them, the VR helmet is provided with an IMU gyroscope, which can collect the user's movement track, orientation and posture in real time.

In this embodiment, each of the laser radar module, depth camera and VR handle has its own coordinate system, and it is necessary to use the data calculating processor in the VR helmet to convert the coordinate system of the laser radar module, depth camera and VR handle so as to calculate the coordinate data with the world coordinate system as each part of the second coordinate system. For example, after the laser radar module detects the coordinate and contour of the obstacle under its own coordinate system, it is necessary to use the data calculating processor in the VR helmet to convert the detection data of the laser radar module, so as to obtain the coordinate and contour of the obstacle under the world coordinate system; after the depth camera detects the coordinate and contour of the obstacle under its own coordinate system, it is necessary to use the data calculating processor in the VR helmet to convert the detection data of the depth camera so as to obtain the coordinate and contour of the obstacle under the world coordinate system; after setting safe area under VR handle coordinate system using VR handle, the coordinate of safe area needs to be converted to obtain the coordinate of safe area under world coordinate system.

In some embodiment, the virtual reality experience safe area updating device also includes:
  a first prompting module, configured to alarm if it is detected that a user approaches a boundary of the safe area or enters a region outside the safe area. The first prompt module can emit a prompt tone to remind the user, can also emit a vibration to remind the user, and can also remind the user by displaying alarm information.

In some embodiment, the virtual reality experience safe area updating device also includes:
  a second prompting module, configured to prompt a user to clear the obstacle if the ratio of the area of the updated safe area to the area of the initial safe area is less than a preset second threshold. The second prompt module can emit a prompt tone to remind the user, can also emit a vibration to remind the user, and can also remind the user by displaying alarm information.

In this embodiment, the safe area can be updated through laser radar module and depth camera, so as to avoid the problem that VR device users cannot see the surrounding environment and thus cannot feel the surrounding obstacle, thus increasing the safety of users and improving the user experience.

Figure 5:
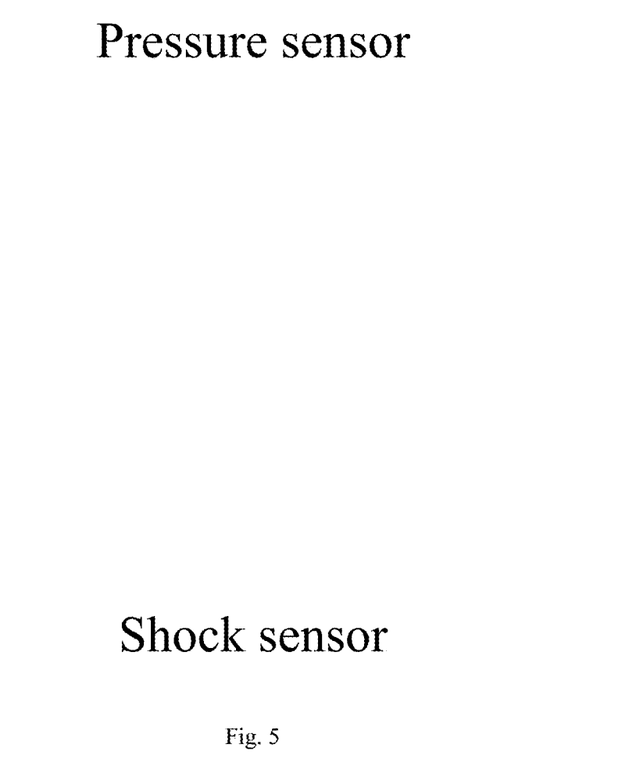
FIG. 5 is a schematic diagram of an embodiment pressure sensing unit of the present disclosure.
Figure 6:
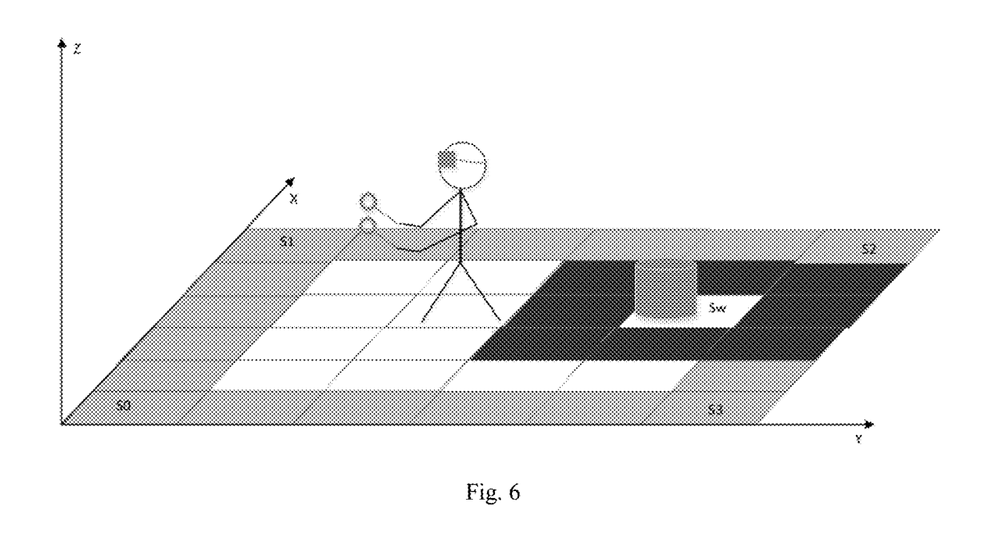
FIG. 6 is a schematic diagram of the composition of an embodiment pressure sensing unit of the present disclosure into a safe area.

In some embodiment, as shown in FIGS. 5 and 6, the obstacle detecting module comprises:

A plurality of pressure sensing units arranged in an array are located on the ground of the initial safe area, each square in FIG. 6 represents one pressure sensing unit, the region where different pressure sensing units are located do not overlap, and the region where all the pressure sensing units are located together constitute the initial safe area; as shown in FIG. 5, each of the pressure sensing units is provided with at least one pressure sensor for sensing the pressure to which the pressure sensing unit is subjected; at least one shock sensor may also be provided for vibrating to remind a user;

a processor, configured to receive pressure data of each of the pressure sensing units, detecting that the pressure data is greater than a candidate pressure sensing unit of a preset first threshold value, judging whether the user is located at the region where the candidate pressure sensing unit is located, and if the user is not located at the region where the candidate pressure sensing unit is located, removing the region where the candidate pressure sensing unit is located from the initial safe area to obtain an updated safe area.

There is no need to participate in laser radar module and depth camera in this embodiment, nor to use VR handle to draw initial safe area. The pressure sensing unit is configured to form the initial safe area, and the pressure sensing unit is used as the unit to update the safe area, which has strong scalability, high accuracy and no detection blind area. As shown in FIGS. 5 and 6, a single pressure sensing unit has a rectangular shape, such as a square shape. An pressure sensor and a shock sensor are arranged on an pressure sensing unit; the pressure sensor is used for sensing the pressure to which the pressure sensing unit is subjected; and there is an interface for splicing around the pressure sensing unit, and the interface can be used for data transmission.

A pressure sensing unit is spliced to form an initial safe area, and the range of the safe area is the range covered by the pressure sensing unit, i. e. a closed region surrounded by s0-s1-s2-s3.

When performing safe area update, the VR helmet can be placed at a coordinate origin, and the coordinate origin can be a point set on the pressure sensing unit, position initialization is performed, and the helmet position and attitude acquired by the VR helmet IMU gyroscope are sent to the processor, and the VR helmet centre position calibration is performed, so that a real-time position of the VR helmet can be calculated according to the position of the coordinate origin, and the real-time position is the coordinate under the coordinate system of the pressure sensing unit.

If there is an obstacle located in the position of the pressure sensing unit Pw in the safe area, the pressure at Pw will increase, and the pressure data sensed by the pressure sensor of the pressure sensing unit Pw is greater than a preset first threshold value, wherein the first threshold value can be set as required. At this time, it can be judged whether the user is located in the pressure sensing unit Pw according to the position information about the VR helmet, and then it can be judged whether the pressure data sensed by the pressure sensor of the pressure sensing unit Pw is derived from the weight of the user; if the VR helmet is not located in the pressure sensing unit Pw, it can be judged that the data of the pressure sensing unit Pw is not derived from the weight of the user, but derived from the obstacle, it can be judged that the obstacle is located in the pressure sensing unit Pw, and the pressure sensing unit Pw is removed from the initial safe area. By analogy, the safe area can be updated according to the pressure data of the pressure sensing unit.

In some embodiment, the virtual reality experience safe area updating device also includes:

a first prompting module, configured to alarm if it is detected that a user approaches a boundary of the safe area or enters a region outside the safe area. The first prompt module can emit a prompt tone to remind a user, can also use a shock sensor to emit a vibration to remind a user, and can also remind a user by displaying alarm information. For example, the shock sensor may vibrate for a long time to remind VR device users that there is obstacle around them and do not go ahead. If the VR device user reaches the boundary of safe area, a staring-staring-staring shock will be generated to remind the user that the boundary has been reached, please go back.

In some embodiment, the virtual reality experience safe area updating device also includes:

a second prompting module, configured to prompt a user to clear the obstacle if the ratio of the area of the updated safe area to the area of the initial safe area is less than a preset second threshold. The second prompt module can emit a prompt tone to remind the user, can also emit a vibration to remind the user, and can also remind the user by displaying alarm information.

The second threshold may be set as needed, for example, to 50%. If the range occupied by the obstacle exceeds 50% of the original safe area, all shock sensor will emit continuous vibration, and the VR helmet will prompt "Remove Helmet, clean obstacle".

In this embodiment, the safe area can be updated via the pressure sensing unit, avoiding the problem that the VR device user cannot see the surrounding environment and thus cannot feel the surrounding obstacle, increasing the safety of the user and improving the user experience.

Figure 7:
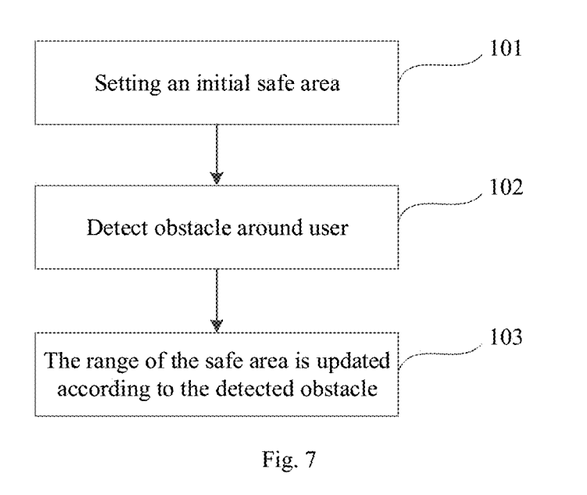
FIG. 7 is a flow diagram of an embodiment virtual reality experience safe area update method of the present disclosure.

The embodiment of the present disclosure also provides a virtual reality experience safe area update method, applied to a VR device, as shown in FIG. 7, comprising:

Step 101: setting an initial safe area;

Step 102: detecting obstacle around a user;

Step 103: the range of the safe area is updated according to the detected obstacle.

In this embodiment, after the initial safe area is set, the obstacle in the safe area is detected, and after the obstacle is detected, the range of the safe area is updated according to the detected obstacle, so that the range of the safe area can be updated in real time according to the situation of the obstacle to ensure the safety of the wearer.

In some embodiment, the setting an initial safe area comprises:

After receiving the Instruction that the user indicates to initialize the safe area, VR handle is configured to draw a closed region as the safe area in the space according to the operation Instruction of the user.

The VR device comprises a VR helmet and a VR handle, wherein the VR helmet can contain an IMU gyroscope, a depth camera, a data calculating processor and a rendering processor; the VR handle may contain an IMU inertial navigation system to acquire the real-time position and attitude of the VR handle.

The setting of safe area needs to be performed through a VR handle. After starting the VR device, the user can click a button of "initializing safe area" through the VR handle; after the VR handle receives the Instruction that the user indicates to initialize safe area, the user takes the VR handle to draw a closed region in the space; VR handle sets this closed region as the initial safe area according to the user's operation Instruction. The initial safe area shall have no obstacle hindering the user's action, but if dynamic or static obstacle occurs in the safe area, it will affect the user's safety. Therefore, the safe area needs to be updated dynamically according to the range of obstacle.

As shown in FIG. 1, the region defined by a dotted line therein is an initial safe area, wherein the initial safe area takes a point where the position where the VR handle starts is perpendicular to the status as an origin O, the direction of starting the movement is an X axis, the opposite direction of ending the movement is a Y axis, and the Z axis is perpendicular to the XY plane; and the representation of the boundary of the safe area under the coordinate system is composed of a stack of discrete points connected to form a line. The safe area is a three-dimensional space, and the coordinate axes of the coordinate system of the safe area are the X-axis, the Y-axis and the Z-axis, and the coordinate system is the coordinate system of the VR device.

In some embodiments, detecting the obstacle in the safe area comprises:

The coordinate and contour of the obstacle around the user are determined based on the received laser signal by using the laser radar module to emit the laser signal 360° around the user and receive the reflected laser signal.

In some embodiments, the laser radar module may comprise M laser radars located in the same plane, the centres of the M laser radars constitute a positive M-sided polygon, the scanning ranges of the M laser radar are all located outside the positive M-sided polygon, the scanning angle of each laser radar is not less than 360/M °, and M is an integer greater than or equal to 3.

The existing VR headset is provided with a depth camera, and the depth camera can photograph the environment in the direction facing the VR headset, but cannot photograph the depth image in the direction facing away from the VR headset, which would lead to a detection blind zone and cannot detect the obstacle behind the user. Considering the head display structure and user comfort, it is not suitable to install more depth camera in the head display. In this embodiment, laser radar module is configured to detect obstacle, which can detect 360° obstacle around the user, so as to avoid the detection blind zone.

Laser radar module can be worn on the user, such as binding on the lower leg of the user through straps, and transmitting and receiving laser signal in 360° range with the user as the center.

As shown in FIG. 3, in a specific example, the laser radar module comprises four laser radars (1, 2, 3 and 4) located on the same plane; the four laser radars are fixed on the laser radar straps equidistantly; the centres of the four laser radars form a rectangle; the scanning ranges of the four laser radars are all located outside the rectangle; the scanning angle of each of the laser radars is 90°; and the scanning ranges of different laser radars are different. As shown in the left half of FIG. 3, each laser radar comprises a laser emitting receiver 10 and a mirror structure 11, wherein the mirror of the mirror structure 11 can rotate at a uniform speed, so that the angle between the mirror and the laser emitted by the laser emitting receiver 10 is between 0°-90°; the mirror reflects the laser emitted by the laser emitting receiver 10 and then emits same; the laser encounters the obstacle and is reflected by the obstacle to the mirror; the laser emitting receiver 10 can determine the coordinate and contour of the obstacle through the received laser. Here, each laser radar can detect an obstacle within an angle theta range, and theta is 90° so that an obstacle within a user 360° range can be detected by four laser radars.

Of course, the number of laser radars included in the laser radar module is not limited to four, but can also be more, which can improve the accuracy of obstacle detection; the laser radar module may also comprise fewer laser radars, such as 3 laser radars, as long as the laser radar module is able to detect an obstacle within a 360° range of the user.

When a laser radar receives a returned laser signal at a certain angle, the distance s between the obstacle of the angle and the user is calculated according to the distance formula. Wherein the position of the user in the safe area can be determined by the IMU gyroscope provided on the VR helmet, and whether the obstacle is located in the initial safe area can be judged according to the position of the user in the safe area and the distance between the obstacle and the user in the angle; if the obstacle is located in the initial safe area, the position P of the obstacle will be calculated and transmitted to the safe area update module in the VR helmet so as to remind the user; if the obstacle is outside the original safe area, the obstacle is ignored. Wherein the distance formula is:

$$s = \frac{t_1 - t_0}{2} * v$$

Where t1 is the time when the laser signal is received, t0 is the time when the laser signal is emitted, and v is the propagation speed of the laser.

In this embodiment, the position P of the obstacle is calculated after judging that the obstacle is located within the initial safe area, and if the obstacle is located outside the initial safe area, the position of the obstacle is not calculated, and the calculation amount can be reduced.

In some embodiment, it is also possible to use the depth camera set on the VR headset of the VR device to photograph the environment in the direction faced by the VR headset, and determine the coordinate and contour of the obstacle around the user according to the depth image obtained by photographing. The depth camera can photograph a scene in the travel direction of the user to obtain a depth image; the depth image can capture the obstacle, and can also determine the distance between the obstacle and the user, the size of the obstacle and the contour.

In some embodiment, the updating the range of the safe area according to the detected obstacle comprises:
converting a first coordinate of the obstacle detected by the obstacle detecting module into a second coordinate under a second coordinate system, if it is judged that the detected obstacle is located in the safe area according to the coordinate range of the safe area under the second coordinate system and the second coordinate, calculating the space occupied by the obstacle according to the second coordinate and the contour of the obstacle, and removing the space occupied by the obstacle from the initial safe area to obtain an updated safe area, wherein the second coordinate system is a coordinate system or a world coordinate system of a VR device, the first coordinate is a coordinate under a first coordinate system, and the first coordinate system is a coordinate system of the obstacle detecting module.

As shown in FIG. 4, assuming that an obstacle is detected and the obstacle is located in an initial safe area S0, calculating a space S1 occupied by the obstacle according to the coordinate and contour of the obstacle, removing the space S1 from the safe area S0, and the updated safe area being S0-S1. When space S1 is removed, the boundary of safe area needs to be redefined, and the boundary of safe area can be redefined according to the boundary of space S1, so that the updated safe area does not include space S1.

In some embodiment, if VR device only includes laser radar module, the first space occupied by the first obstacle can be calculated according to the coordinate and contour of the first obstacle detected by the laser radar module, and the first space occupied by the obstacle is removed from the initial safe area to obtain an updated safe area.

If the obstacle detecting module comprises both laser radar module and depth camera, the coordinate and contour of the first obstacle detected by the laser radar module and the coordinate and contour of the second obstacle detected by the depth camera may or may not be completely the same. If the coordinate and contour of the first obstacle detected by the laser radar module are not completely the same as the coordinate and contour of the second obstacle detected by the depth camera, updating the range of the safe area according to the detected obstacle comprises:

calculating a first space occupied by the first obstacle according to the coordinate and contour of the first obstacle, calculating a second space occupied by the second obstacle according to the coordinate and contour of the second obstacle, taking the union set of the first space and the second space as the space occupied by the obstacle, and removing the space occupied by the obstacle from the initial safe area to obtain the updated safe area.

For example, a laser radar module detects coordinate and contour of a first obstacle, and calculates a first space S2 occupied by the first obstacle according to the coordinate and contour of the first obstacle; the depth camera detects coordinate and contour of a second obstacle, and calculates a second space S3 occupied by the second obstacle according to the coordinate and contour of the second obstacle; take the union of S3 and S2, which includes both S3 and S2, and remove the union from the initial safe area to obtain the updated safe area. In this way, the safe area can be updated by combining the detection results of laser radar module and depth camera, so as to improve the accuracy of detection, ensure the safety of users and provide comfortable experience for users.

If the coordinate and contour of the first obstacle detected by the laser radar module are completely the same as the coordinate and contour of the second obstacle detected by the depth camera, indicating that the two detected obstacle are the same, the first space occupied by the first obstacle can be calculated according to the coordinate and contour of the first obstacle, the second space occupied by the second obstacle can also be calculated according to the coordinate and contour of the second obstacle, and the first space or the second space is removed from the initial safe area to obtain an updated safe area.

In this embodiment, the laser radar module will real-time scan the information within the 360° range of the user, while the depth camera is generally towards the travel direction of the user, only the image in the travel direction will be photographed; therefore, the laser radar module can be configured to scan the obstacle within the 360° range of the user firstly, and if it is found that the obstacle appears behind the user, the user can be prompted to turn the head towards the obstacle, and information about the obstacle is further collected through the depth camera, so that the depth camera is enabled only when the obstacle behind the user is detected, and the power consumption of the depth camera can be reduced. Among them, the VR helmet is provided with an IMU gyroscope, which can collect the user's movement track, orientation and posture in real time.

Figure 8:
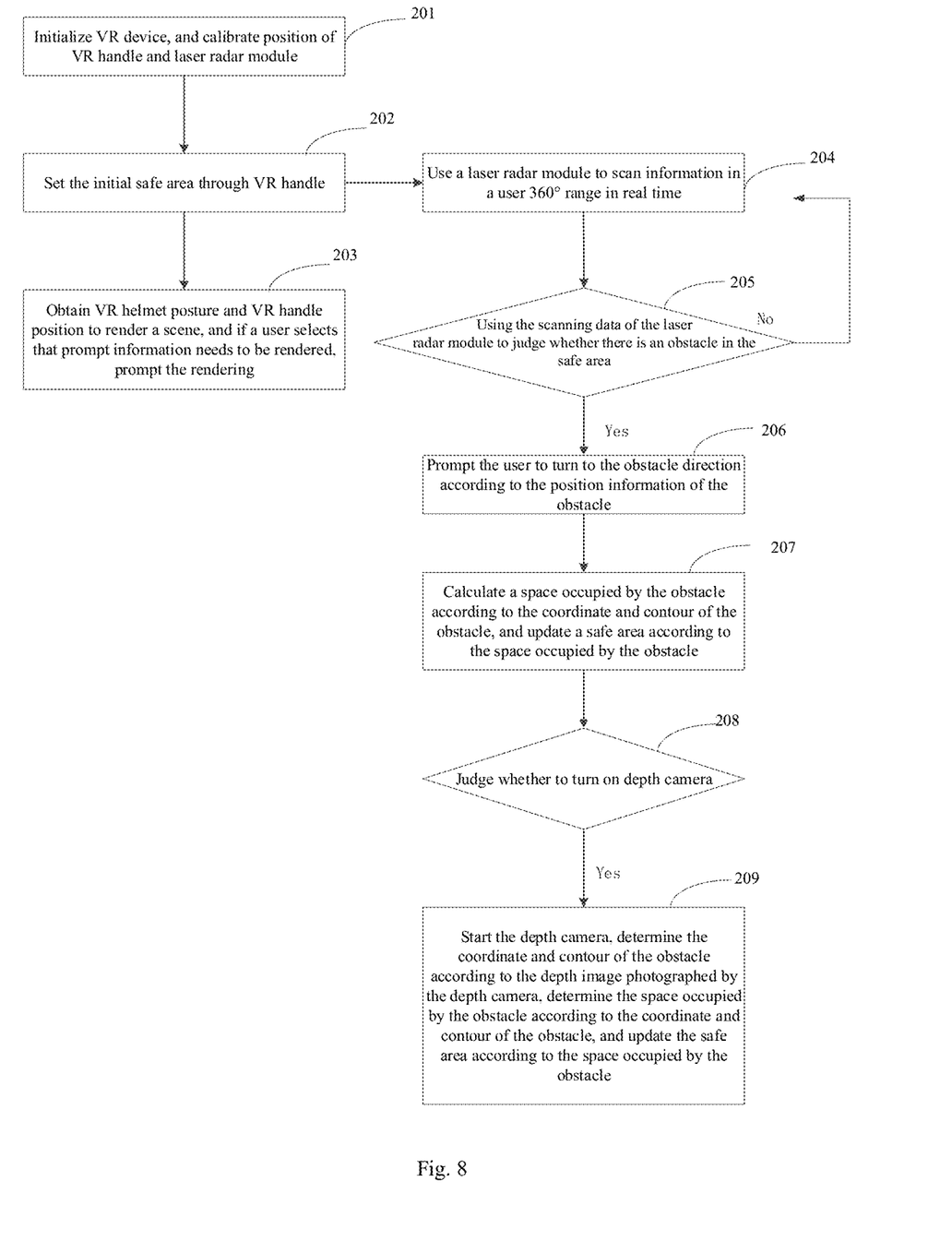
FIG. 8 is a flow diagram for updating safe area for the embodiment of the present disclosure.

As shown in FIG. 8, in a embodiment, a method for updating a virtual reality experience safe area comprises the following steps:

Step 201: initialize VR device, and calibrate position of VR handle and laser radar module;

Step 202: set the initial safe area through VR handle;

Step 203: obtain VR helmet posture and VR handle position to render a scene, and if a user selects that prompt information needs to be rendered, prompt the rendering;

Step 204: using a laser radar module to scan information in a user 360° range in real time;

Step 205: using the scanning data of the laser radar module to judge whether there is an obstacle in the safe area, and if so, turning to step 206; if not, go to step 204;

Step 206: prompt the user to turn to the obstacle direction according to the position information of the obstacle;

Step 207: calculate a space occupied by the obstacle according to the coordinate and contour of the obstacle, and update a safe area according to the space occupied by the obstacle;

Step 208: judging whether depth camera is turned on, and if it is judged that depth camera is turned on, going to step 209;

Step 209: start the depth camera, determine the coordinate and contour of the obstacle according to the depth image photographed by the depth camera, determine the space occupied by the obstacle according to the coordinate and contour of the obstacle, and update the safe area according to the space occupied by the obstacle.

In this embodiment, each of the laser radar module, depth camera and VR handle has its own coordinate system, and it is necessary to use the data calculating processor in the VR helmet to convert the coordinate system of the laser radar module, depth camera and VR handle so as to calculate the coordinate data with the world coordinate system as each part of the second coordinate system. For example, after the laser radar module detects the coordinate and contour of the obstacle under its own coordinate system, it is necessary to use the data calculating processor in the VR helmet to convert the detection data of the laser radar module, so as to obtain the coordinate and contour of the obstacle under the world coordinate system; after the depth camera detects the coordinate and contour of the obstacle under its own coordinate system, it is necessary to use the data calculating processor in the VR helmet to convert the detection data of the depth camera so as to obtain the coordinate and contour of the obstacle under the world coordinate system; after setting safe area under VR handle coordinate system using VR handle, the coordinate of safe area needs to be converted to obtain the coordinate of safe area under world coordinate system.

In this embodiment, the safe area can be updated through laser radar module and depth camera, so as to avoid the problem that VR device users cannot see the surrounding environment and thus cannot feel the surrounding obstacle, thus increasing the safety of users and improving the user experience.

In some embodiment, a plurality of pressure sensing units arranged in arrays are provided on the ground of the initial safe area, the region where different pressure sensing units are located do not overlap, and all the region where pressure sensing units are located constitute the initial safe area, and each the pressure sensing unit is provided with at least one pressure sensor, and detecting obstacle in the safe area comprises:

The pressure received by the pressure sensing unit is sensed by the pressure sensor to obtain pressure data;

Detecting a candidate pressure sensing unit of which pressure data is greater than a preset first threshold value; judging whether the user is located in a region where the candidate pressure sensing unit is located; and if the user is not located in a region where the candidate pressure sensing unit is located, removing the region where the candidate pressure sensing unit is located from an initial safe area to obtain an updated safe area.

There is no need to participate in laser radar module and depth camera in this embodiment, nor to use VR handle to draw initial safe area. The initial safe area is composed by pressure sensing unit, and the safe area is updated by pressure sensing unit, which has strong expansibility and high precision. As shown in FIGS. 5 and 6, a single pressure sensing unit has a rectangular shape, such as a square shape. An pressure sensor and a shock sensor are arranged on an pressure sensing unit; the pressure sensor is used for sensing the pressure to which the pressure sensing unit is subjected; and there is an interface for splicing around the pressure sensing unit, and the interface can be used for data transmission.

A pressure sensing unit is spliced to form an initial safe area, and the range of the safe area is the range covered by the pressure sensing unit, i. e. a closed region surrounded by s0-s1-s2-s3.

When performing safe area update, the VR helmet can be placed at a coordinate origin, and the coordinate origin can be a point set on the pressure sensing unit, position initialization is performed, and the helmet position and attitude acquired by the VR helmet IMU gyroscope are sent to the processor, and the VR helmet centre position calibration is performed, so that a real-time position of the VR helmet can be calculated according to the position of the coordinate origin, and the real-time position is the coordinate under the coordinate system of the pressure sensing unit.

If there is an obstacle located in the position of the pressure sensing unit Pw in the safe area, the pressure at Pw will increase, and the pressure data sensed by the pressure sensor of the pressure sensing unit Pw is greater than a preset first threshold value, wherein the first threshold value can be set as required. At this time, it can be judged whether the user is located in the pressure sensing unit Pw according to the position information about the VR helmet, and then it can be judged whether the pressure data sensed by the pressure sensor of the pressure sensing unit Pw is derived from the weight of the user; if the VR helmet is not located in the pressure sensing unit Pw, it can be judged that the data of the pressure sensing unit Pw is not derived from the weight of the user, but derived from the obstacle, it can be judged that the obstacle is located in the pressure sensing unit Pw, and the pressure sensing unit Pw is removed from the initial safe area. By analogy, the safe area can be updated according to the pressure data of the pressure sensing unit.

Beside, if it is detected that the user approaches the border of the safe area or enters the region outside the safe area, giving an alarm. The user can be reminded by sending a prompt tone, can also be reminded by using shock sensor to send a vibration, and can also be reminded by displaying alarm information. For example, the shock sensor may vibrate for a long time to remind VR device users that there is obstacle around them and do not go ahead. If the VR device user reaches the boundary of safe area, a staring-staring-staring shock will be generated to remind the user that the boundary has been reached, please go back.

Further, if the area ratio of the updated safe area to the initial safe area is less than the preset second threshold, prompting the user to clear the obstacle. The user can be reminded by sending a prompt tone, can also be reminded by sending a vibration, and can also be reminded by displaying alarm information.

The second threshold may be set as needed, for example, to 50%. If the range occupied by the obstacle exceeds 50% of the original safe area, all shock sensor will emit continuous vibration, and the VR helmet will prompt "Remove Helmet, clean obstacle".

The embodiments of the present disclosure also provide a virtual reality experience safe area updating apparatus, wherein the virtual reality experience safe area updating apparatus is applied to a VR device, and the virtual reality experience safe area updating apparatus comprises: Memory and actuator, the actuator for performing the method as described above, will not be described in detail herein.

In each method embodiment of the present disclosure, the sequence number of each step cannot be configured to define the sequence of each step, and for a person of ordinary skill in the art, without involving any inventive effort, the sequence of each step is also within the protection range of the present disclosure.

It should be noted that each embodiment in this specification is described in a progressive manner, the same and similar parts between each embodiment can be referred to each other, and each embodiment focuses on the differences from other embodiment. In particular, for the embodiment, since it is substantially similar to the product embodiment, the description is relatively simple, and it is sufficient to refer to the partial description of the product embodiment.

The above description is only a embodiment of the present disclosure, but the protection range of the present disclosure is not limited thereto, and any person skilled in the art familiar with the present technical field can easily conceive changes or substitutions within the technical range disclosed in the present disclosure, and all should be included in the protection range of the present disclosure. Accordingly, the protection range of the present disclosure shall be subject to the protection range of the claims.

What is claimed is:

1. A virtual reality experience safe area updating apparatus, applied to a Virtual Reality (VR) device, comprising:
   a safe area setting module configured to set an initial safe area;
   an obstacle detecting module, configured to detect an obstacle around the user; and
   a safe area updating module, configured to update the range of the safe area according to the detected obstacle;
   wherein the obstacle detecting module comprises:
   a laser radar module, which is configured to take a user as a centre, emit a laser signal towards 360° around the user, and receive the reflected laser signal, and determine coordinate and contour of an obstacle around the user according to the received laser signal;

a depth camera arranged on the VR headset of the VR device, configured to photograph the environment in the direction faced by the VR headset, and determining coordinate and contour of the obstacle around the user according to the depth image obtained by photographing;

wherein the coordinate and contour of a first obstacle detected by the laser radar module are not completely the same as the coordinate and contour of a second obstacle detected by the depth camera, the safe area updating module calculates a first space occupied by the first obstacle according to the position and contour of the first obstacle, calculates a second space occupied by the second obstacle according to the coordinate and contour of the second obstacle, takes the union set of the first space and the second space as the space occupied by the obstacle, and removes the space occupied by the obstacle from the initial safe area to obtain the updated safe area.

2. The virtual reality experience safe area updating apparatus according to claim 1, wherein the laser radar module comprises M laser radars located in the same plane, the centers of the M laser radars constitute a positive M-sided polygon, the scanning ranges of the M laser radars are all located outside the positive M-sided polygon, the scanning angle of each laser radar is not less than 360/M degrees, and M is an integer greater than or equal to 3.

3. The virtual reality experience safe area updating apparatus according to claim 2, wherein the laser radar module comprises four laser radars located on the same plane, the centers of the four laser radars constitute a square, the scanning ranges of the four laser radars are all located outside the square, the scanning angle of each of the laser radars is 90 degrees, and the scanning ranges of different laser radars are different.

4. The virtual reality experience safe area updating apparatus of claim 1, wherein:

the safe area updating module is configured to convert a first coordinate of the obstacle detected by the obstacle detecting module into a second coordinate under a second coordinate system, if it is judged that the detected obstacle is located in the safe area according to the coordinate range of the safe area under the second coordinate system and the second coordinate, calculating the space occupied by the obstacle according to the second coordinate and the contour of the obstacle, obtaining an updated safe area, wherein the second coordinate system is a coordinate system or a world coordinate system of the VR device, the first coordinate is a coordinate under the first coordinate system, and the first coordinate system is a coordinate system of the obstacle detecting module.

5. The virtual reality experience safe area updating apparatus according to claim 1, wherein the obstacle detecting module comprises:

a plurality of pressure sensing units located on the ground of the initial safe area and arranged in multiple array arrangement, wherein the region where different pressure sensing units are located do not overlap, and the region where all the pressure sensing units are located constitute the initial safe area, and each of the pressure sensing unit is provided with at least one pressure sensor for sensing the pressure received by the pressure sensing unit;

a processor, configured to receive pressure data of each of the pressure sensing units, detecting that the pressure data is greater than a candidate pressure sensing unit of a preset first threshold value, judging whether the user is located at the region where the candidate pressure sensing unit is located, and if the user is not located at the region where the candidate pressure sensing unit is located, removing the region where the candidate pressure sensing unit is located from the initial safe area to obtain an updated safe area.

6. The virtual reality experience safe area updating apparatus of claim 1, further comprising:

a first prompting module, configured to alarm if it is detected that a user approaches a boundary of the safe area or enters a region outside the safe area.

7. The virtual reality experience safe area updating apparatus of claim 1, further comprising:

a second prompting module, configured to prompt a user to clear the obstacle if the ratio of the area of the updated safe area to the area of the initial safe area is less than a preset second threshold.

8. A virtual reality experience safe area updating method, applied to a Virtual Reality (VR) device, comprises:

setting an initial safe area;

detecting the obstacle around a user; and updating the range of the safe area according to the detected obstacle;

wherein detecting the obstacle in the safe area comprises:

using a laser radar module, taking a user as a centre, emitting a laser signal towards 360° around the user, and receiving the reflected laser signal, and determining coordinate and contour of an obstacle around the user according to the received laser signal;

wherein detecting the obstacle in the safe area further comprises: photographing an environment in a direction faced by the VR headset using a depth camera set on the VR headset of the VR device, and determining coordinate and contour of the obstacle around the user according to a depth image obtained by photographing;

wherein if the coordinate and contour of the first obstacle detected by the laser radar module are not completely the same as the coordinate and contour of the second obstacle detected by the depth camera, updating the range of the safe area according to the detected obstacle comprises:

calculating a first space occupied by the first obstacle according to the coordinate and contour of the first obstacle, calculating a second space occupied by the second obstacle according to the coordinate and contour of the second obstacle, taking the union set of the first space and the second space as the space occupied by the obstacle, and removing the space occupied by the obstacle from the initial safe area to obtain the updated safe area.

9. The virtual reality experience safe area updating method according to claim 8, wherein the updating the range of the safe area according to the detected obstacle comprises:

converting a first coordinate of the obstacle detected by the obstacle detecting module into a second coordinate under a second coordinate system, if it is judged that the detected obstacle is located in the safe area according to the coordinate range of the safe area under the second coordinate system and the second coordinate, calculating the space occupied by the obstacle according to the second coordinate and the contour of the obstacle, and removing the space occupied by the obstacle from the initial safe area to obtain an updated safe area, wherein the second coordinate system is a coordinate system or a world coordinate system of a VR device, the first coordinate is a coordinate under a first coordinate system, and the first coordinate system is a second coordinate system of the obstacle detecting module.

10. The virtual reality experience safe area updating method according to claim 8, further comprising:

if it is detected that the user approaches the border of the safe area or enters the region outside the safe area, giving an alarm.

11. The virtual reality experience safe area updating method according to claim 8, further comprising:

if the area ratio of the updated safe area to the initial safe area is less than the preset second threshold, prompting the user to clear the obstacle.

12. A virtual reality experience safe area updating apparatus, wherein the virtual reality experience safe area updating apparatus is applied to VR device, and the virtual reality experience safe area updating apparatus comprises: a memory and an actuator, the actuator being configured to perform the method according to claim 8.

* * * * *